(12) United States Patent
Jackson

(10) Patent No.: US 6,273,219 B1
(45) Date of Patent: Aug. 14, 2001

(54) PENDULUM BRAKE BEAM

(76) Inventor: Robert G. Jackson, P.O. Box 277, Benton Harbon, MI (US) 49023-0277

( * ) Notice: Subject to any disclaimer, the term of this patent is extended or adjusted under 35 U.S.C. 154(b) by 0 days.

(21) Appl. No.: 09/282,969

(22) Filed: Mar. 31, 1999

Related U.S. Application Data

(60) Provisional application No. 60/080,633, filed on Apr. 3, 1998.

(51) Int. Cl.$^7$ .................................................. B61H 13/00
(52) U.S. Cl. ...................... 188/53; 188/250 B; 188/219.1
(58) Field of Search ................... 188/52, 53, 54, 188/250 B, 250 E, 250 G, 250 R, 207, 215, 219.1, 220.1, 249; 403/119, 161, 150

(56) References Cited

U.S. PATENT DOCUMENTS

| | | | | |
|---|---|---|---|---|
| 3,009,544 | * | 11/1961 | Maloney et al. ........................ | 188/52 |
| 3,679,028 | * | 7/1972 | Mulcahy et al. ........................ | 188/52 |
| 4,193,480 | * | 3/1980 | Malo ....................................... | 188/52 |
| 4,401,197 | * | 8/1983 | Bohla et al. ............................ | 188/334 |
| 4,596,311 | * | 6/1986 | Brodeur et al. ................. | 188/1.11 W |
| 4,771,868 | * | 9/1988 | Haydu ..................................... | 188/52 |
| 5,000,298 | | 3/1991 | Jackson et al. .................... | 188/219.1 |
| 5,456,337 | | 10/1995 | Jackson .................................. | 188/52 |

FOREIGN PATENT DOCUMENTS 55-97537  * 7/1980 (JP) ................................ 188/250 B

OTHER PUBLICATIONS

Car Builders' Cycolpedia, 16 Edition 1943; pp. 1012 & 1017 as indicated; p. 1015—not indicated on copy Simmons, Boardman Publishing Corporation, 30 Church Street, New York City.

* cited by examiner

*Primary Examiner*—Robert J. Oberleitner
*Assistant Examiner*—Mariano Sy
(74) *Attorney, Agent, or Firm*—Baker & Daniels

(57) ABSTRACT

A brake beam assembly of the present invention includes an elongated beam disposed between railroad car truck sidewalls which carries brake pads at its ends, and is guided under power of an actuator between a standby and a braking position by a pair of pivot arms which swing in a pendulum-like fashion from pins mounted to the truck sidewalls.

18 Claims, 7 Drawing Sheets

PENDULUM BRAKE BEAM

CROSS-REFERENCE TO RELATED APPLICATION

This is a continuation of application Ser. No. 60/080,633 filed Apr. 3, 1998.

FIELD OF THE INVENTION

The present invention relates to railroad car brakes and will have special application to brake beams for use with railroad cars.

SUMMARY OF THE INVENTION

Conventional railroad car braking systems typically consist of opposed brake beams carrying brake pads disposed adjacent the wheels of the railroad car truck. To slow or stop the car, the beams are shifted along a predetermined linear path from a standby position to a braking position in which the brake pads frictionally engage the wheels. The beams are guided between the standby and braking positions by extensions projecting laterally from the ends of the beams into slots or pockets in the truck sidewalls. Such end extensions, however, occasionally become misaligned and lodged within the sidewall pockets due to irregularities in the end extensions, misaligned sidewall pockets, or railroad track curves and irregularities which shift the truck sidewalls relative to one another. Also, conventional beam ends have a tendency to bend in the direction of wheel travel due to braking torque and can eventually become permanently deformed. Such brake beam deformities can impair proper travel of the end extensions within the pockets. Furthermore, when a rail car couples with another car, the impact can shift one beam of each pair away from the wheels toward the center of the car truck where it can jam. Multiple braking applications may then be required to dislodge the beam and shift it far enough toward the wheels to provide proper braking.

Imperfect travel of the end extensions within the sidewall pockets can also produce undesirable brake pad wear. Many pads are replaced because one portion of the pad, usually either the top or the bottom, has worn to an unacceptable thickness due to beam misalignment. The material remaining on the rest of the pad is wasted.

Also, conventional pads tend to crack or brake upon initial contact with the wheel. When the adjacent wheel is worn or the beam is misaligned, only a corner or edge of the pad engages the wheel. This concentrates force at the perimeter of the pad and can crack or brake the pad and reduce its useful life.

The present invention provides a brake beam which is suspended between the truck sidewalls by a pair of pivot arms that guide the beam along an arcuate path between a standby and a braking, position. Each arm is attached to a beam end and pivotally mounted to the adjacent truck sidewall at a location offset from the axle. When a standard actuating mechanism urges the beam toward the wheels, the pivot arms swing the beam in a pendulum-like manner along a curved path toward the wheels into a braking position. The brake pads at the ends of the beam frictionally engage the wheels to slow or stop wheel rotation. The beam is swung back into the standby position in a similar manner.

In another embodiment of the invention, the brake pads are formed into a curved wedge with a cross-sectional width that decreases from the lower end to the upper end. A ridge protrudes from the braking side of the pad toward the adjacent wheel and extends between the lower end and the upper end of the pad to provide an initial point of contact between the brake pad and the wheel.

Since the beam assembly of the present invention does not use beam end extensions, the brake beam should not jam in position, thereby ensuring effective braking with one stroke of the actuating mechanism. Also, the pivot arms of the beam assembly resist beam end deformation. The braking force vectors created when the brake pads contact the rotating wheels are substantially absorbed as tension or compression force along the axis of the pivot arms.

Additionally, the curved or arcuate path of the pivot arms force a brake pad wear pattern that ensures that each pad is substantially fully worn, and therefore not wasted, at the time pad replacement is necessary. The wedge-shaped embodiment of the brake pad also extends the useful life of the pad since the entire thickness of the thicker, lower end of the pad must wear down before the remaining portions of the pad wear. Moreover, the ridge protruding from the brake pad permits the pad to gradually increase contact with the wheel to avoid cracking or braking at the beginning of the service life of the pad.

Accordingly, an object of the present invention is to provide a brake beam which will not be prone to jam or bind in an inoperable position.

Another object is to provide a brake beam which, unlike conventional beams, is designed not to jam in response to coupling of railroad cars.

Still another object of the present invention is to provide a brake beam which resists deformation due to braking torque.

Another object is to provide a brake beam which increases the useful life of the brake pads.

Other objects of this invention will become apparent upon a reading of the following, description.

BRIEF DESCRIPTION OF THE DRAWINGS

The above-mentioned and other objects and advantages of this invention, and the manner of attaining them, will become more apparent and the invention will be better understood by reference to the following description of embodiments of the invention taken in conjunction with the accompanying drawings, wherein.

Figure 1:
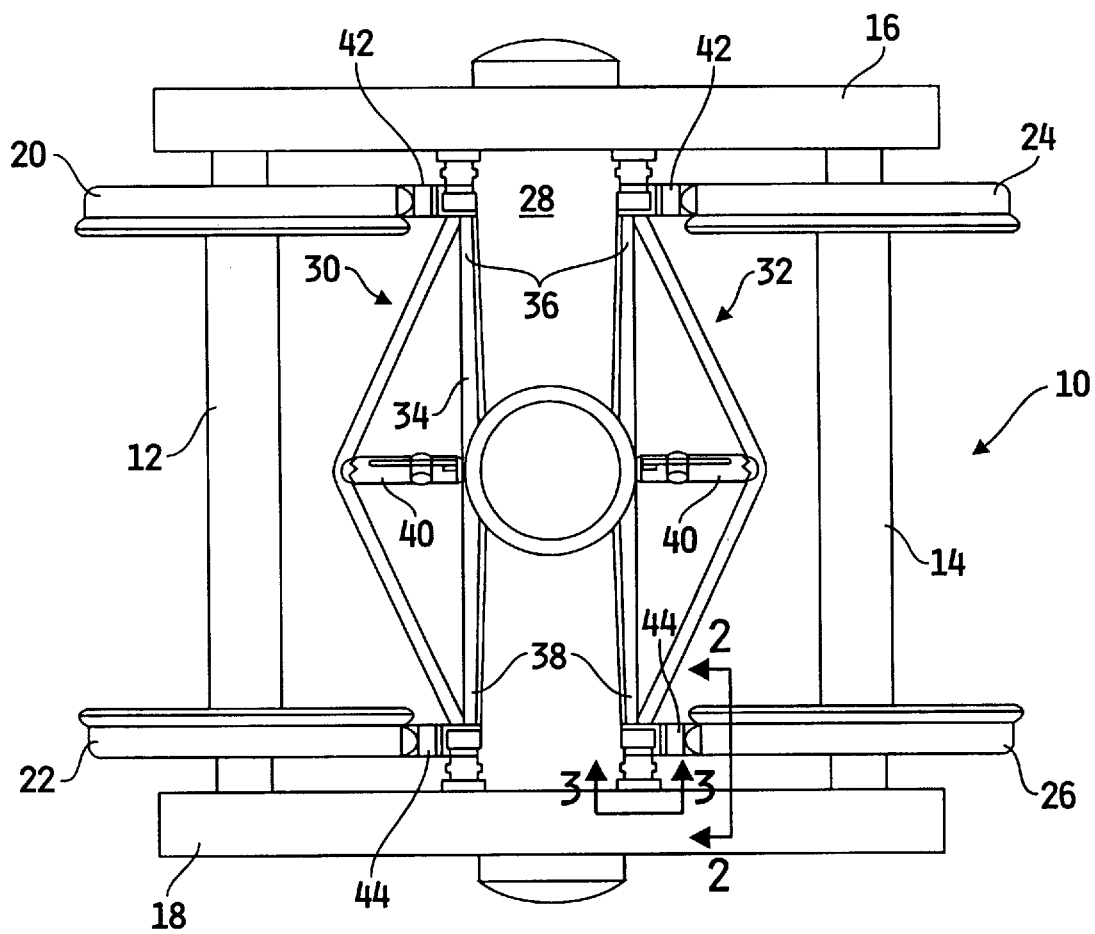
FIG. 1 is a top plan view of the beam assembly.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out below illustrate embodiments of the invention, in several forms, and such exemplifications are not to be construed as limiting the scope of the invention in any manner.

DESCRIPTION OF THE INVENTION

The embodiments disclosed in the detailed description below are not intended to be exhaustive or to limit the invention to the precise forms disclosed. Rather, the embodiments selected for the description are disclosed so that others skilled in the art may utilize their teachings.

FIG. 1 shows railroad car truck 10 including axles 12,14 which are journaled in suitable bearing blocks in the sidewalls or sideframes 16,18 and which accommodate the rotatable wheels 20,22,24,26. Sideframes 16,18 are spaced apart by a bolster 28. Truck 10 is outfitted with two brake beam assemblies 30,32. Since beam assemblies 30,32 are similar, only one assembly, namely beam assembly 32, will be described in detail.

Figure 2:
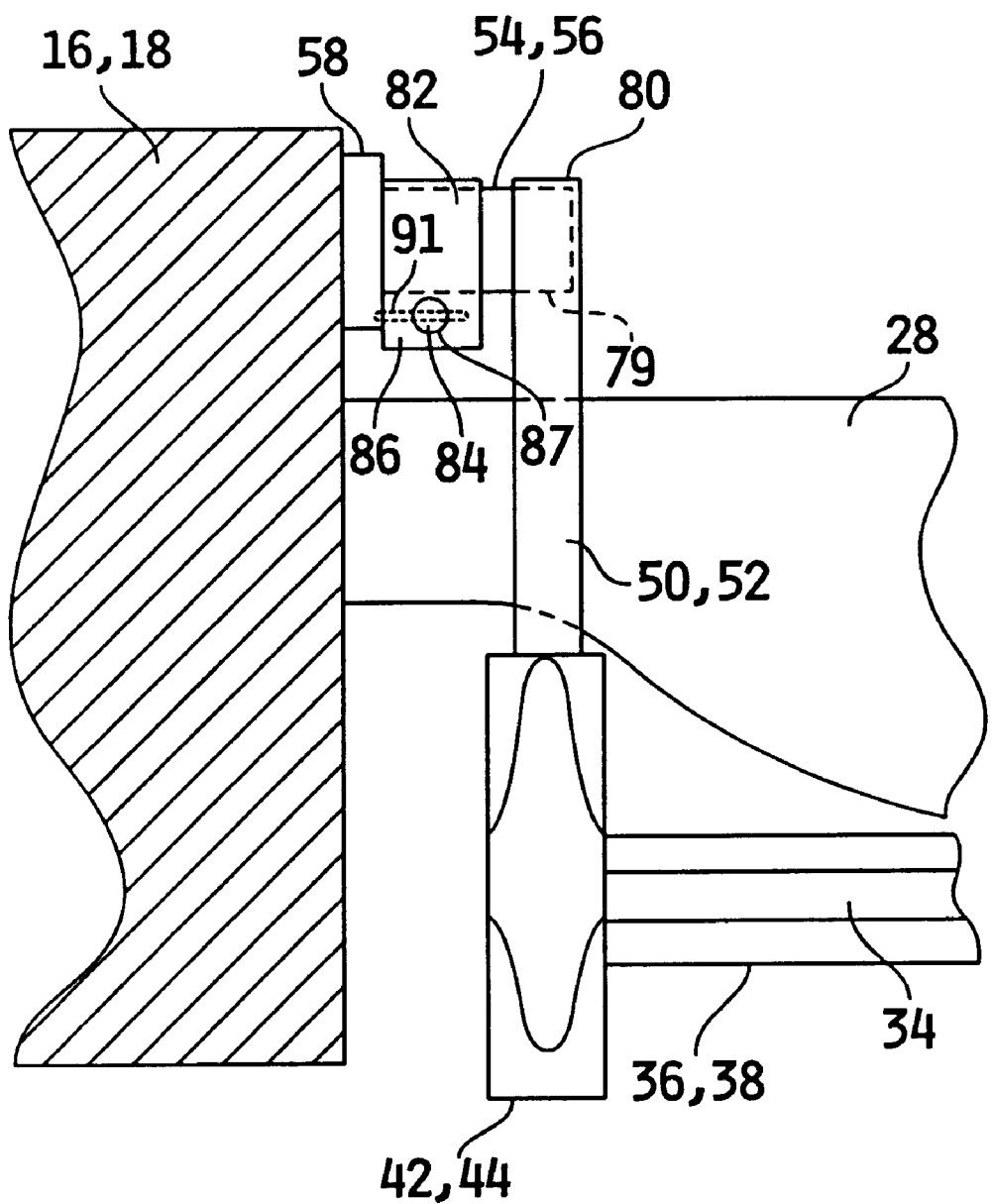
FIG. 2 is a partial cross-sectional view taken along line 2—2 of FIG. 1.

Assembly 32 includes an elongated beam 34 which is situated between sideframes 16,18 so that the brake members 42,44 mounted to the ends 36,38 of beam 34 are disposed adjacent wheels 20,22. An actuator 40 is connected between bolster 28 and beam 34 of the beam assembly to move beam 34 toward and away from wheels 20,22 relative to the bolster. Various actuators could be employed such as the actuation mechanisms described in U.S. Pat. Nos. 4,771, 868 and 5,069,312 which are incorporated herein by reference or opposed cylinder orientation. Referring jointly to both sides of the beam assembly which are of like construction, a pair of pivot arms 50,52 extend from attached beam ends 36,38 to a pair of pivot pins 54,56 as shown in FIG. 2. Each pivot arm 50,52 has an opening 79 formed in its upper end 80 that serves as a bearing sleeve for the inserted supporting pivot pin 54,56. In this manner, pivot arms 50,52 are journaled for pivotal movement to swing beam 34 toward and away from wheels 20,22 upon use of actuator 40.

Each pivot pin 54,56 extends from a mounting block 58 which is fixed to a sideframe 16,18. An inverted U-shaped spacer 82 fits over each pin 54,56 between mounting block 58 and upper end 80 of pivot arm 50,52 to accomplish a predetermined spacing of the pivot arms 50,52 from sideframes 16,18 and the resulting alignment of brake member 42,44 with wheels 20,22. A fastener 84 fits though aligned bores 87 which extend through legs 86 of each spacer 82. A cotter pin 91 retains fastener 84 in position. One skilled in the art could readily implement other spacers including interlocking C-shaped halves, cylindrical collars, or other configurations.

Figure 3:
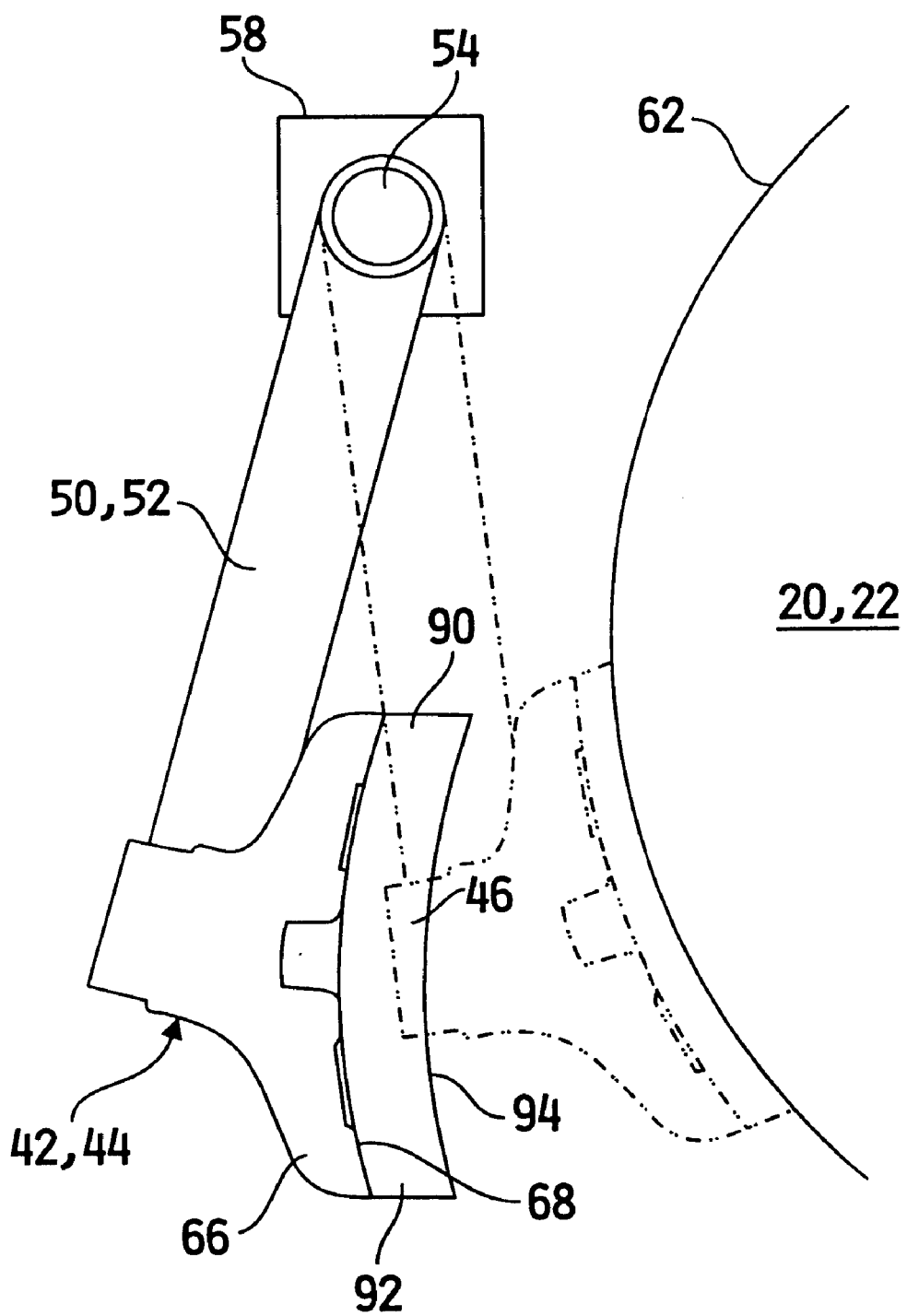
FIG. 3 is a partial side elevational view as seen from line 3—3 of FIG. 1 illustrating the arcuate movement of the brake beam assembly of the present invention.

As best shown in FIG. 3, each brake member 42,44 includes a brake shoe or head 66 which is supported in a generally vertical orientation by its supporting pivot arm 50,52. Each brake head 66 has a side 68 which faces the circumferential surface 62 of the adjacent wheel 20,22 and which is formed into a curved profile substantially conforming in shape to surface 62. A brake pad 46 is mounted on each brake head 66 using standard techniques such as by locking keys, rivets or a bonding agent. FIG. 3 shows a conventional brake pad 46 which is of substantially uniform thickness and which includes an upper end 90, a lower end 92 and an arcuate braking surface 94 therebetween. Each pivot arm 50,52 may be provided with a strain gage to allow the determination of the force applied to the brake head 66 by the beam 34.

MODE OF OPERATION

In operation, actuator 40 moves assembly 32 toward and away from wheels 20,22 between a standby position (shown in solid lines) and a braking position (shown in broken lines) as seen in FIG. 3. When in a standby position, actuator 40 holds beam 34, which is supported by pivot arms 50,52, inwardly towards bolster 28 with braking surfaces 94 of brake pads 46 being spaced from adjacent wheel surfaces 62. When the train is to be slowed or stopped, beam 34 swings by pivot arms 50,52 toward wheels 20,22 under power of actuator 40 along an arcuate path until braking surfaces 94 of the brake pads 46 engage circumferential surfaces 62 of wheels 20,22 to slow the rotation of the wheels. By swinging from pendulum-like pivot arms 50,52, beam assembly 32 avoids the difficulties associated with end extensions as used in conventional brake beams which travel within sideframe pockets.

The arcuate path provided by pivot arms 50,52 also creates a predictable and efficient brake pad 46 wear pattern. As pivot arms 50,52 swing beam 34 toward wheels 20,22 bringing brake pads 46 into contact with circumferential surfaces 62 of the wheels, upper ends 90 of pads 46 first engage wheel surfaces 62. As brake pads 46 are repeatedly brought into contact with rotating wheels 20,22, upper ends 90 begin to wear and conform to the contour of circumferential wheel surfaces 62. Eventually, after repeated braking applications, lower ends 92 of brake pads 46 also frictionally engage wheel surfaces 62. The position of pivot pins 54,56 on sideframes 16,18, and the length of arms 50,52, are designed to allow brake pads 46 to wear to a minimum generally uniform acceptable thickness such as seen in broken lines in FIG. 3. Therefore, brake assembly 32 of the present invention, unlike conventional brake beams, provides for generally even and substantially complete brake pad 46 wear.

Figure 4:
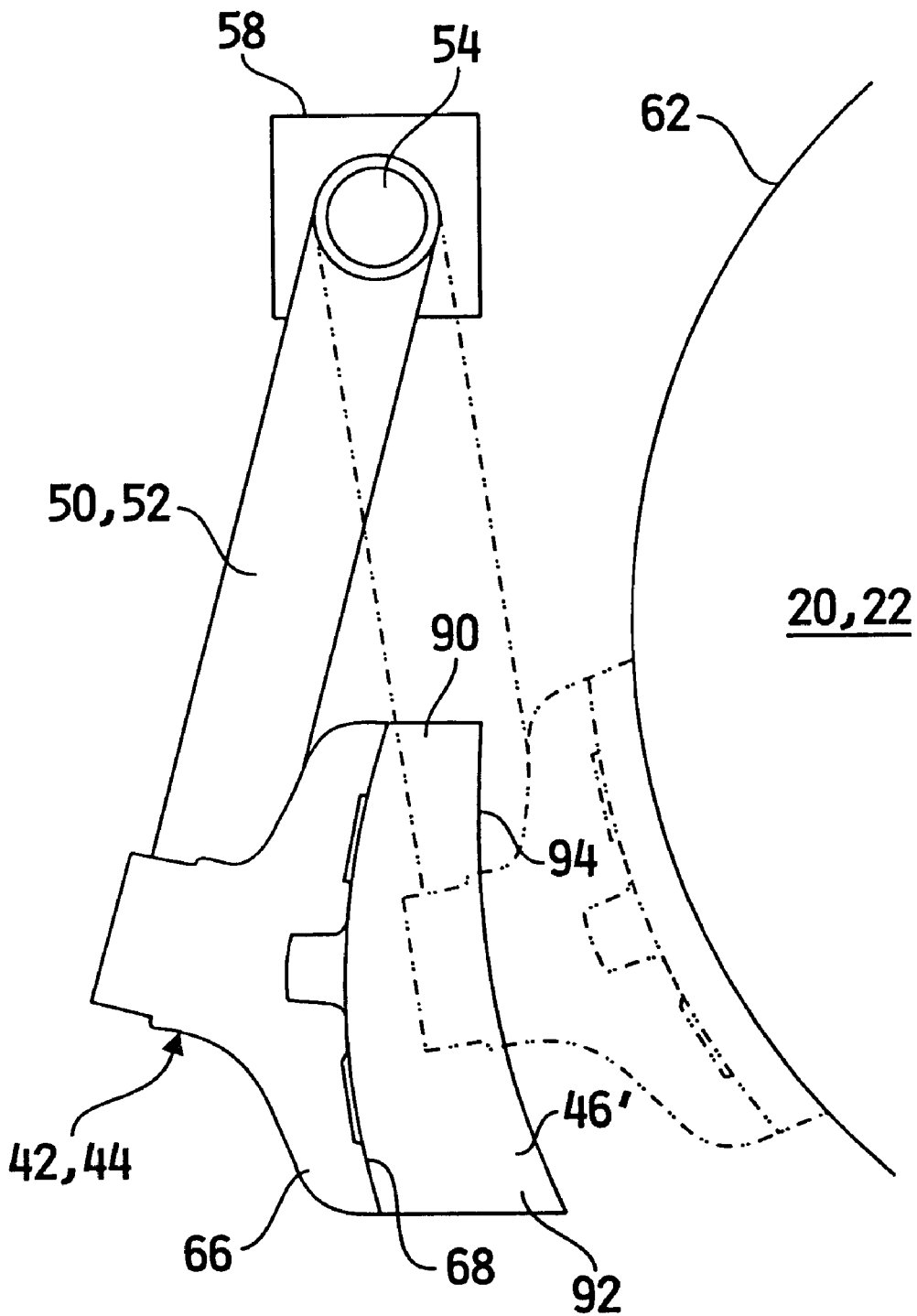
FIG. 4 is like FIG. 3 but showing a different embodiment of the brake pad of the present invention.

FIG. 4 shows an alternate embodiment of the brake pad of the present invention. Brake pad 46' has a tapering thickness from lower end 92 to upper end 90 which may be segmented. Again, when located in a standby position (solid lines), pad 46' is spaced from wheel surface 62. Unlike brake pad 46, however, when brake pad 46' is moved into a braking position (broken lines), initial contact is usually between a substantial portion of braking surface 94 and circumferential wheel surface 62 depending upon the wheel profile, wheel size, and pivot location of the pivot arm. As pad 46' wears with repeated braking applications and substantially all of braking surface 94 frictionally engages wheel surface 62 at the same time, the arcuate path of pivot arm 50,52 ensures that the thicker lower end 92 of pad 46' wears down before appreciable wear to the rest of pad 46' occurs. As such, the wedge shape provides a greater number of braking applications per pad. In some applications of use, it may be desirable to move the arm pivot so the arm is almost vertical, allowing at least slight brake pad contact (no substantial forcible engagement) with the wheel at all times.

Figure 5:
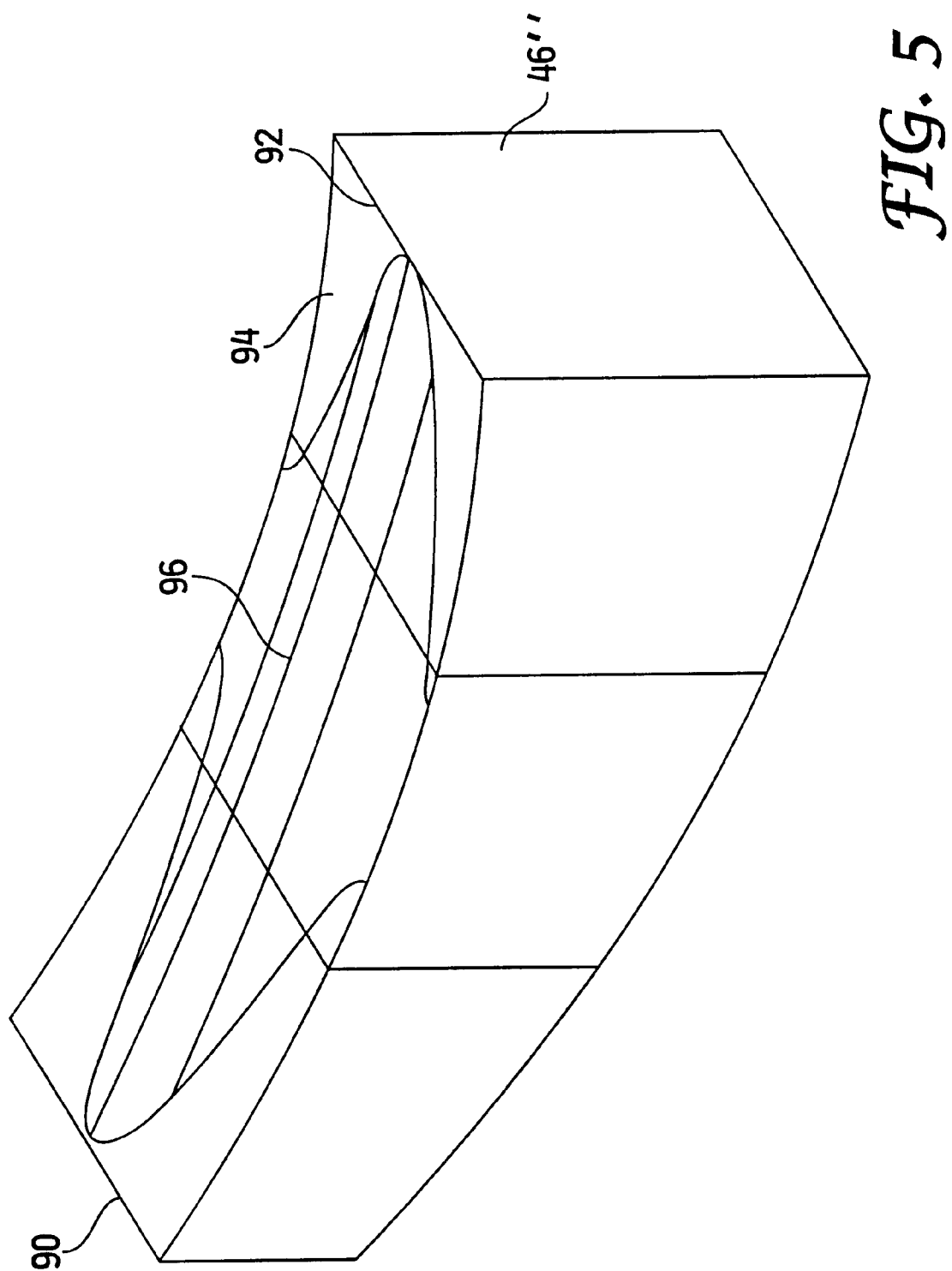
FIG. 5 is a perspective view of another embodiment of the brake pad of the present invention.
Figure 6:
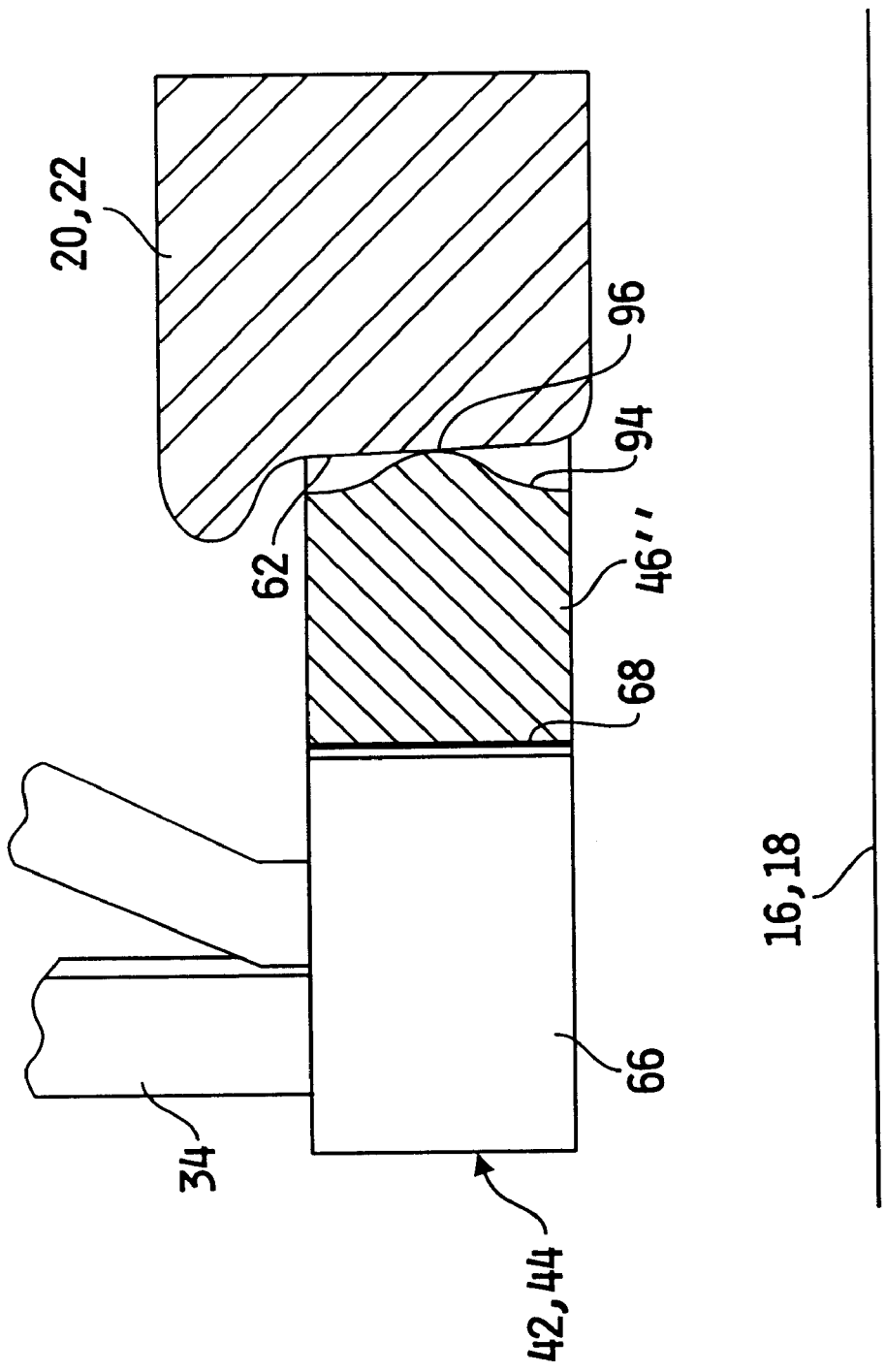
FIG. 6 is a fragmented top plan view of the brake pad of FIG. 5 shown in conjunction with a brake shoe as applied to a wheel.

FIG. 5 shows still another embodiment of the brake pad of the present invention. Brake pad 46" includes a ridge 96 that protrudes from contacting surface 94 and extends between the pad's tower end 92 and tipper end 90. Ridge 96 provides an area of initial contact between pad 46" and wheel surface 62 which is near the center of pad braking surface 94. As shown in FIG. 6, because ridge 96 protrudes from contacting surface 94 of brake pad 46", when brake beam 34 is urged into a braking position, ridge 96 contacts wheel surface 62 before other portions of pad surface 94 engage wheel surface 62, regardless of whether surface 62 is new or badly worn. Ridge 96 thus provides a point of initial contact with wheel surface 62 which greatly reduces the risk of breakage due to stress imparted to brake pad 46" upon initial contact with rotating wheel 20,22.

Figure 7:
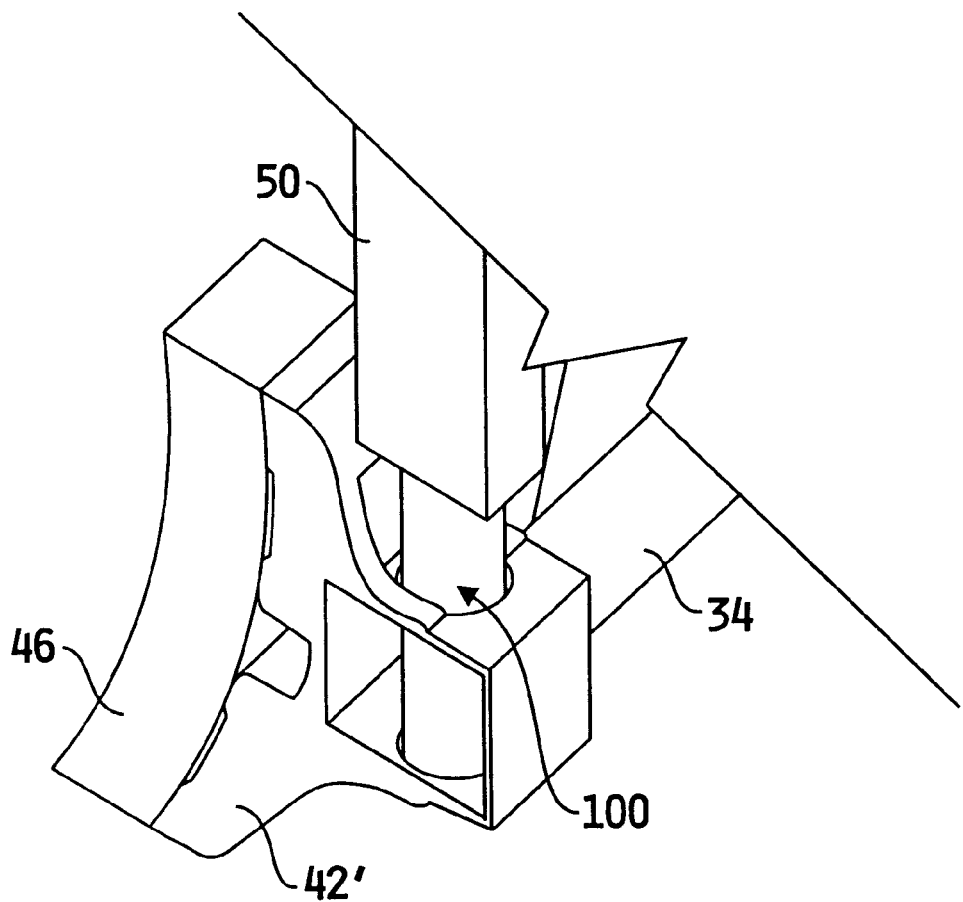
FIG. 7 is a partial view showing an articulated connection.

To accommodate shoes or pads of different thickness carried by a beam assembly, such as the use of a new pad and a worn pad, the connection between at least one of the pivot arms 50 or 52 and its attached beam 34 is preferably formed to be articulated. In FIG. 7 such an articulated joint 100 allowing limited rotational movement of brake member 42' about a general vertical axis is shown between pivot arm 50 and beam 34.

It is to be understood that the invention is not to be limited to the details above given but may be modified within the scope of the appended claims.

I claim:

1. A brake beam assembly in combination with a railroad car truck having a pair of wheels supported upon an axle extending between two sidewalls of the truck, said brake beam assembly comprising:

an elongated beam;

a pair of brake members connected adjacent the ends of said beam, each brake member having a brake pad including a surface for contacting an adjacent said wheel;

an actuation mechanism for moving said beam between a non-braking position and a braking position relative to said wheel; and a pair of pivot arms connected to said beam said pivot arms for guiding said beam along an arcuate path within said sidewalls between said non-braking position wherein said brake pads do not forcibly engage said wheels and said braking position wherein said brake pads forcibly engage said wheels, said arcuate path of said pivot arms forcing said brake pads to wear such that each brake pad is fully worn to a minimum uniform thickness.

2. Assembly of claim 1 wherein both of said pivot arms have an upper end portion, each upper end portion having a pivot arm opening and said assembly further comprises a pair of pivot pins disposed on said sidewalls, each of said pivot pins fitted into one of said pivot arm openings to accommodate movement of said pivot arms in guiding said beam.

3. Assembly of claim 2 further comprising spacers adjustably coupled onto each pivot pin between said sidewall and said upper end portion of the supporting pivot arm for centering said beam between the sidewalls with each brake pad aligned with a said wheel.

4. Assembly of claim 3 wherein said spacers include a cylindrical collar which slides onto said pivot pin.

5. Assembly of claim 2 wherein each pivot pin extends perpendicularly outwardly from a sidewall in axial alignment with the other of said pivot pins.

6. Assembly of claim 1 wherein each brake member further includes a brake shoe having a generally vertically oriented side facing said adjacent wheel, said wheel having a circumferential surface, said side having an upper part and a lower part which together form an arcuate profile, said side carrying said brake pad having an upper end and a lower end, said pivot pins being vertically offset above and laterally offset from the axle so that when said beam is moved along said arcuate path into said braking position, said upper parts of the brake shoe sides initially swing closer to the circumferential surfaces of the wheels than said lower parts of the sides until said upper parts and said lower parts are approximately the same distance from said circumferential surfaces.

7. Assembly of claim 6 wherein each brake pad tapers from one thickness at its said lower end to a lesser thickness at its said upper end and has an arcuate wheel contacting surface therebetween.

8. Assembly of claim 6 wherein each brake pad includes an extending ridge protruding outwardly from its said wheel contacting surface, said ridge providing an initial point of contact intermediate said upper and lower ends wherein said initial point of contact protrudes farther outwardly from said wheel contacting surface than any other portion of said brake pad.

9. A braking mechanism for braking the wheels of a railroad car truck having spaced sidewalls, said mechanism comprising:

a beam having ends positioned between said sidewalls;

a pair of pendulum arm means rotatably mounted to the sidewalls and attached to said ends of said beam for guiding the beam along an arcuate path toward and away from the wheels between a braking position and a non-braking position respectively;

actuation means for moving said beam along said arcuate path; and a brake shoe mounted to each beam end and carrying a brake pad, each brake shoe being, disposed generally vertically adjacent said wheel and having an upper part and a lower part;

whereby when said beam is in its said braking position said upper part of each brake shoe is closer to said adjacent wheel than said lower part of the brake shoe until the brake pad is substantially worn out.

10. A brake beam assembly for braking railroad car truck wheels, said brake beam assembly comprising:

an elongated beam;

actuation means for moving said beam toward and away from said wheels;

a pair of brake members connected adjacent the ends of said beam, each brake member having a brake pad, said brake pad tapering from one thickness at one end of the brake pad to a lesser thickness at the opposite end of the brake pad and having an arcuate wheel contacting surface therebetween.

11. Assembly of claim 10 wherein each brake pad includes an area protruding outwardly from said wheel contacting surface of the brake pad to provide an initial contact area intermediate the ends of the brake pad wherein said initial contact area protrudes farther outwardly from said wheel contacting surface than any other portion of said brake pad.

12. Assembly of claim 11 wherein said area is an elongated ridge extending between said one end and said opposite end of the brake pad, and said initial area of contact is centrally located on the brake pad.

13. A brake beam assembly for braking a railroad car truck having a pair of wheels supported upon an axle extending between two sidewalls of the truck, said brake beam assembly comprising:

a beam;

actuation means for moving said beam between a non-baking position and a braking position relative to said wheels; and a pair of brake members connected adjacent the ends of said beam, each brake member having a brake pad including a surface for contacting an adjacent said wheel;

a pair of pivot arm means for guiding said beam along an arcuate path within said sidewalls between said non-braking position wherein said brake pads do not forcibly engage said wheels and said braking position wherein said brake pads forcibly engage said wheels; and an articulation joint coupled between one of said pivot arm means and one of said ends of the beam, said articulation joint permitting pivotal motion about a vertical axis of one of said brake members relative to the other said brake member.

14. Assembly of claim 13 further comprising a pair of pivot pins disposed on the sidewalls for supporting said pair of pivot arm means, said pivot arm means having connecting parts receiving said pivot pins to accommodate movement of said pivot arm means relative to said pivot pins.

15. Assembly of claim 14 wherein each connecting part is generally tubular and includes a circumferentially extending wall defining a cylindrical central bore for receiving one of said pivot pins.

16. Assembly of claim 13, wherein said brake pads have an upper end and a lower end, and said upper and lower ends are forced in the same arcuate path as said beam.

17. A brake pad for use on brakes of a railroad car, said brake pad comprising a rear attachment surface for attachment to a brake shoe, said rear attachment surface having an arcuate shape; an upper end; a lower end; and a front wheel contacting surface including an extending ridge protruding outwardly from said wheel contacting surface, said ridge providing an initial point of contact intermediate said upper and lower ends wherein said initial point of contact protrudes farther outwardly from said wheel contacting surface than any other portion of said brake pad, and wherein said initial point of contact is located generally in the central region of said brake pad, and the ridge protrudes outwardly farther from said wheel contacting surface at said initial point of contact than at the upper and lower ends of said brake pad.

18. A brake pad for use on brakes of a railroad car, said brake pad comprising a rear attachment surface for attachment to a brake shoe, said rear attachment surface having an arcuate shape; an upper end; a lower end; and a front wheel contacting surface including a singular extending ridge protruding outward from said wheel contacting surface, said ridge providing an initial point of contact intermediate said upper and lower ends, and said singular ridge located generally in the central region of said brake shoe.

* * * * *

UNITED STATES PATENT AND TRADEMARK OFFICE
CERTIFICATE OF CORRECTION

PATENT NO. : 6,273,219 B1　　　　　　　　　　　　　　　　　　　　　　Page 1 of 1
DATED : August 14, 2001
INVENTOR(S) : Robert G. Jackson It is certified that error appears in the above-identified patent and that said Letters Patent is hereby corrected as shown below:

<u>Claim 13,</u>
Line 57, delete "non-baking" and insert -- non-braking --

Signed and Sealed this

Twenty-sixth Day of February, 2002

Attest:

Attesting Officer

JAMES E. ROGAN
*Director of the United States Patent and Trademark Office*